R. S. THOMPSON.
CHERRY STEMMING DEVICE.
APPLICATION FILED APR. 14, 1911.
1,022,609.
Patented Apr. 9, 1912.
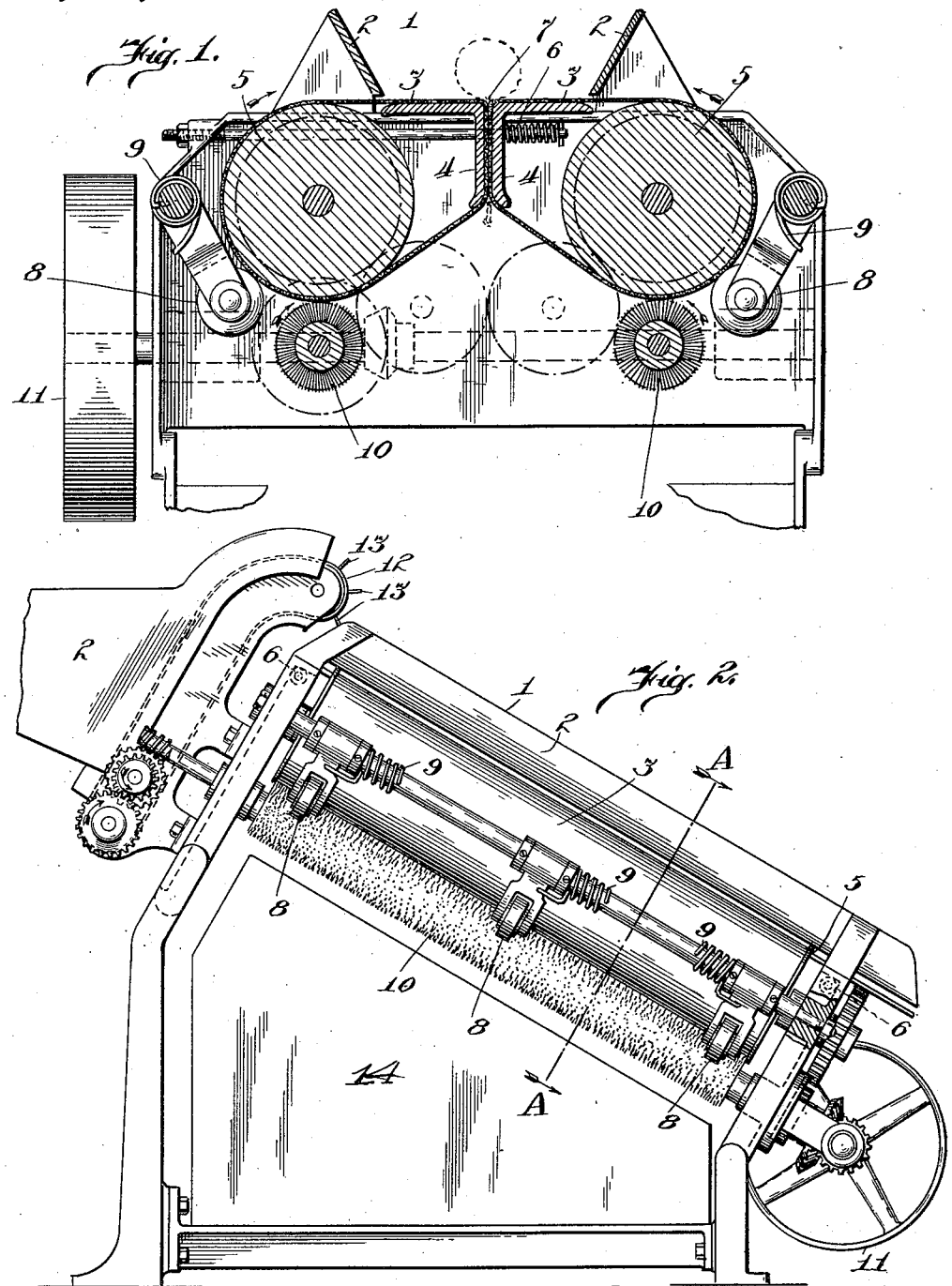

UNITED STATES PATENT OFFICE.

ROY S. THOMPSON, OF CHICAGO, ILLINOIS.

CHERRY-STEMMING DEVICE.

1,022,609.  Specification of Letters Patent.  Patented Apr. 9, 1912.

Application filed April 14, 1911. Serial No. 621,060.

*To all whom it may concern:*

Be it known that I, ROY S. THOMPSON, a citizen of the United States of America, and a resident of Chicago, county of Cook, State of Illinois, have invented certain new and useful Improvements in Cherry-Stemming Devices, of which the following is a specification.

The main object of this invention is to provide an improved form of cherry stemming machine, whereby the stems of cherries may be removed quickly and with certainty by mechanical means without injury to the cherries.

An illustrative construction for accomplishing this object is shown in the accompanying drawings, in which—

Figure 1 is a transverse section of a cherry stemming machine constructed according to this invention. Fig. 2 is a side elevation of the same, the line A—A indicating the plane of section of Fig. 1.

In the construction shown, the machine comprises an inclined trough 1, a feed hopper 2 at the upper end of the trough, a stem collecting receptacle below the trough, and a suitable receptacle for receiving the cherries discharged from the trough. The trough comprises inclined stationary side walls 2, a bottom made up of a pair of belts 3, each of which is mounted to traverse a guide member 4 and roller 5 in such manner that the upper laps of the belts 3 will travel toward each other and pass downward in substantial contact with each other at the middle of the trough. The rollers 5 and guides 4 are inclined transversely to the direction of travel of the belts, as will appear from Fig. 2, and extend substantially throughout the length of the trough. One or both of the guides 4 is mounted to yield toward and away from the other, the relative movement being yieldingly resisted by means of springs 6 at the ends of the guides.

The guides 4 are preferably non-rotatable bars having their opposed faces substantially flat and parallel and being so formed that the gutter formed at 7 where the belts turn downward along the middle line of the trough will allow the stems of the cherries to be drawn into it, but will be too small for the cherries to enter. It is preferred to allow considerable slackness in the belts 3 so as to reduce the wear thereof in their passage over the guides, and in order to insure driving relation of the belts with the rollers 5, in case such slackness exists either intentionally or through stretching of the belts in service, pressure rollers 8 are provided which bear on the belts adjacent to the peripheries of the rollers 5. These are normally urged against the rollers by springs 9.

Rotary brushes 10 are journaled below the rollers 5 so as to have contact with the belts and keep the surfaces thereof clean. These brushes 10 preferably rotate in the same direction as the rollers 5, so that their peripheries will travel in a direction opposite to that of the belts along the lines of contact with the belts. Suitable gearing and driving mechanism is provided as illustrated and power is applied at the pulley 11. Between the trough 1 and feed hopper 2, there is arranged a conveyer 12, comprising a belt provided with shoulders or cleats 13, whereby the cherries are raised from the feed hopper and discharged a few at a time into the trough.

During the operation of the machine, the belts 3 are continuously driven, as is also the conveyer 12. The conveyer 12 carries the cherries upward and discharges them a few at a time into the trough 1, and whatever may be their position as they strike the belts, they will commence to roll down the trough and also be carried sidewise toward the center of the trough, due to the travel of the belts. The stems naturally fall into contact with the belts and the combined action of the tendency of the cherries to roll down the hopper and of the belts 3 to carry whatever has contact with them toward the gutter 7, quickly causes the stems to enter the gutter and to be pulled down into the space between the guides 4 by the belts. The pressure of the springs 6 causes the belts to tightly grip each stem as it enters the gutter 7 and to withdraw it straight downward from the cherry, which, immediately upon being freed from the stem, rolls freely down the trough into a receptacle which is provided at the lower end of the trough for receiving the cherries, but which is not shown in the drawings. The stems fall into another receptacle indicated at 14 in Fig. 2, which also receives any waste matter brushed from the belts by the brushes 10. The yielding of the guides, of course, allows them to separate to accommodate the thickness of the stems, but insures that they will always have a proper grip upon the stems for pulling them out of the cherries.

Although but one specific embodiment of this invention is herein shown and described, it will be understood that numerous details of the construction shown may be altered or omitted without departing from the spirit of this invention, as defined by the following claims.

I claim:—

1. A fruit stemming device, comprising an inclined trough along which the fruit may roll, a pair of guides extending in parallel relation to each other along the middle of said trough, a pair of belts forming the bottom of said trough and mounted to travel toward each other over said guides and then downward between them, whereby the stems of the fruit will be swung by said belts into alinement with said guides and then be drawn into the space between said guides and be pulled from the fruit.

2. A fruit stemming device, comprising an inclined trough along which the fruit may roll, a pair of guides extending in parallel relation to each other along the middle of said trough, a pair of belts forming the bottom of said trough and mounted to travel toward each other over said guides and then downward between them, whereby the stems of the fruit will be swung by said belts into alinement with said guides and then be drawn into the space between said guides and be pulled from the fruit, and one of said guides being mounted to yield relatively to the other to vary the space between them.

3. A fruit stemming device, comprising an inclined trough along which the fruit may roll, a pair of guides extending in parallel relation to each other along the middle of said trough, a pair of belts forming the bottom of said trough and mounted to travel toward each other over said guides and then downward between them, whereby the stems of the fruit will be swung by said belts into alinement with said guides and then be drawn into the space between said guides and be pulled from the fruit, one of said guides being mounted to yield relatively to the other to vary the space between them, and means normally urging said yielding guide toward the other.

4. A cherry stemmer, comprising an inclined trough, a pair of rollers journaled on axes extending parallel with said trough and spaced apart at opposite sides of the middle thereof, a pair of guides extending along the middle line of said trough between said rollers and having their opposed faces substantially flat and parallel, belts carried by said rollers and guides, and means for rotating said rollers to drive said belts toward each other over said guides.

Signed at Chicago this 11th day of April 1911.

ROY S. THOMPSON.

Witnesses:
 EUGENE A. RUMMLER,
 EDWIN PHELPS.

---

Copies of this patent may be obtained for five cents each, by addressing the "Commissioner of Patents, Washington, D. C."